April 21, 1925.
C. H. LUTMAN
1,534,533
SPRING SUSPENSION FOR VEHICLES
Filed June 12, 1924
2 Sheets-Sheet 1
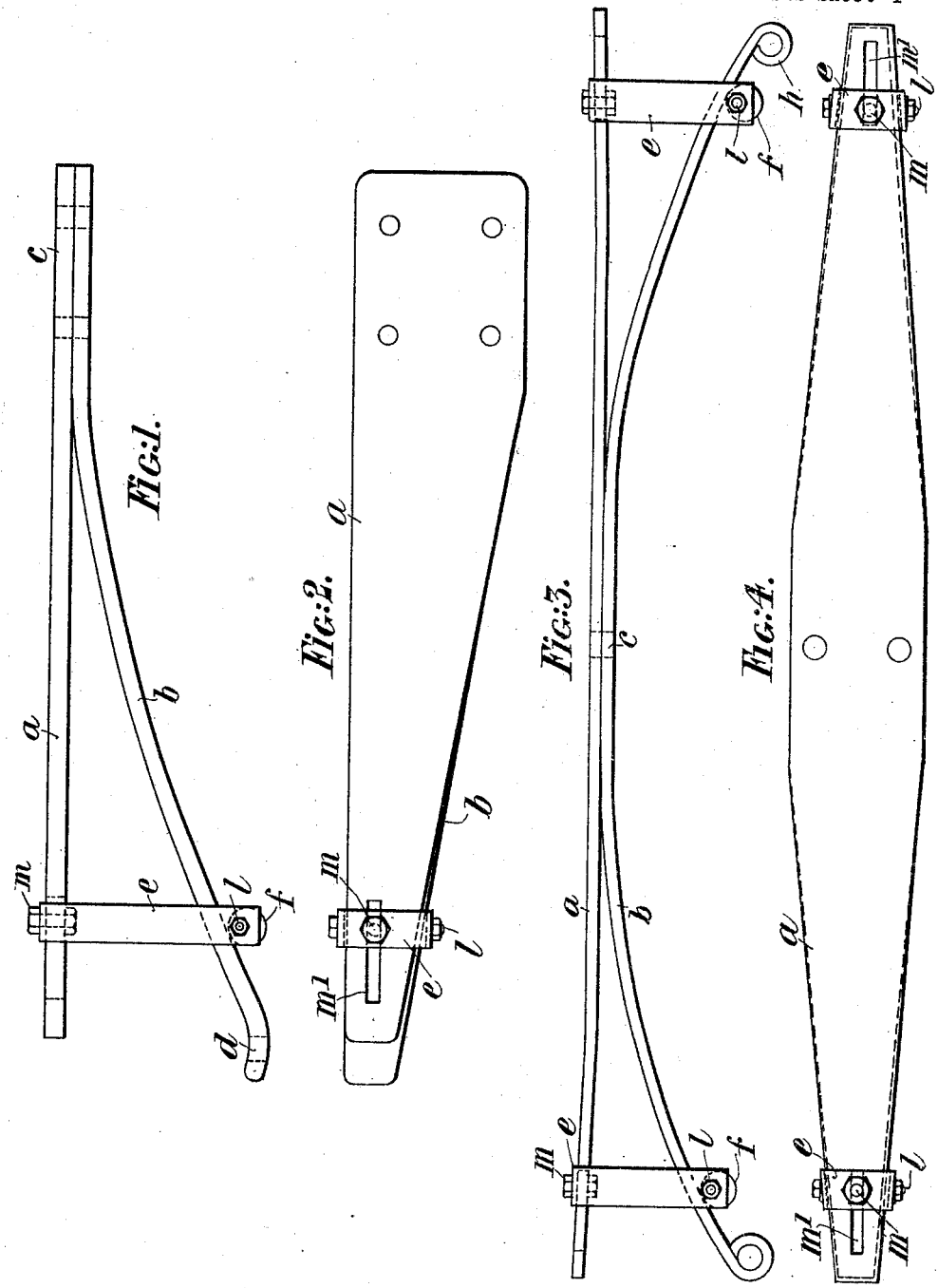
Inventor:
CHARLES HENRY LUTMAN.
by his Attorney:—

April 21, 1925.  C. H. LUTMAN  1,534,533
SPRING SUSPENSION FOR VEHICLES
Filed June 12, 1924  2 Sheets-Sheet 2
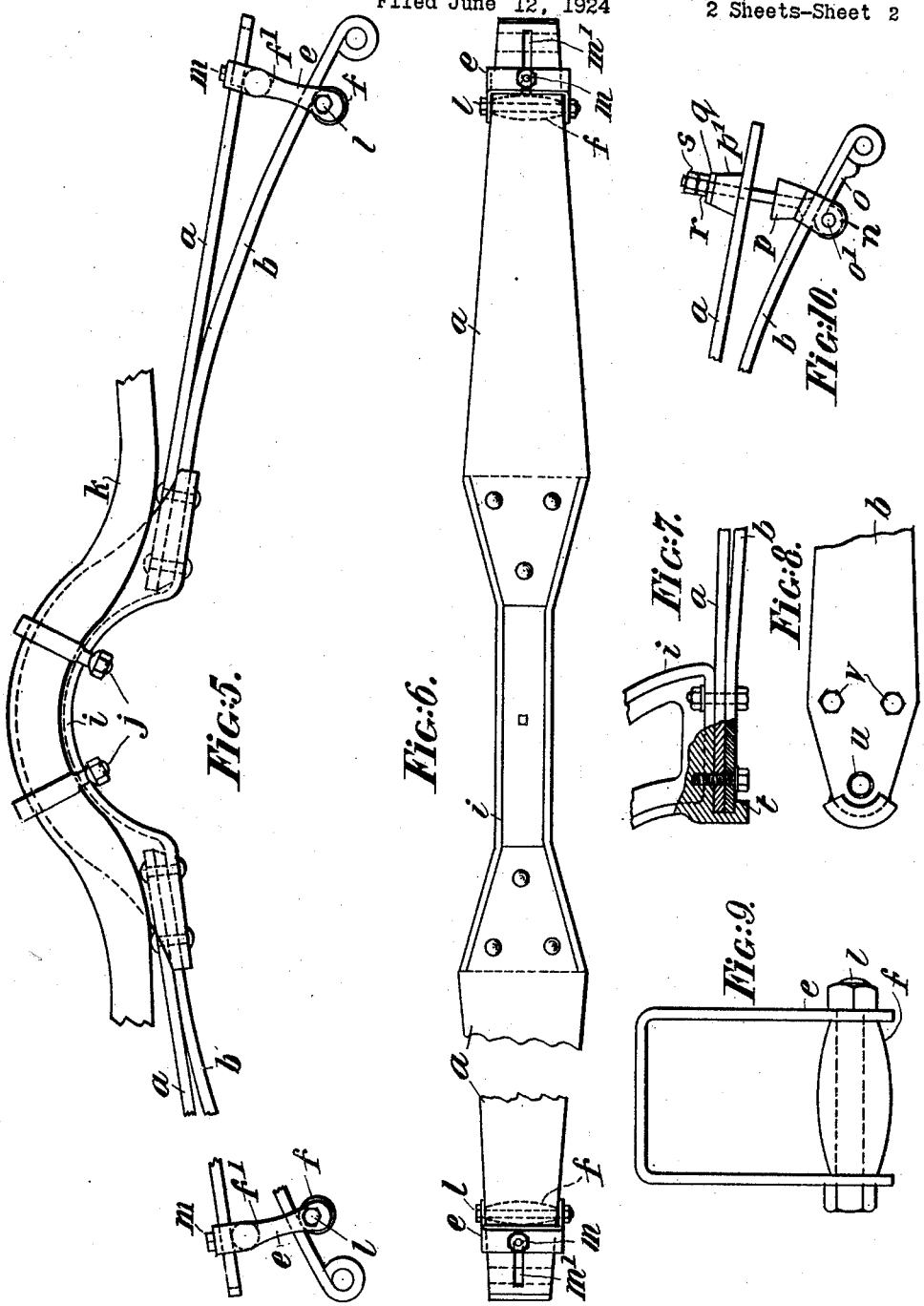
Inventor:
CHARLES HENRY LUTMAN
By his Attorney:

Patented Apr. 21, 1925.

1,534,533

UNITED STATES PATENT OFFICE.

CHARLES HENRY LUTMAN, OF NEWBURN, ENGLAND, ASSIGNOR OF ONE-HALF TO JAMES LIPTROT ARDERN, OF NEWCASTLE-ON-TYNE, ENGLAND.

SPRING SUSPENSION FOR VEHICLES.

Application filed June 12, 1924. Serial No. 719,609.

*To all whom it may concern:*

Be it known that I, CHARLES HENRY LUTMAN, a subject of the King of Great Britain, residing at 80 Westmacott Street, Newburn, in the county of Northumberland, England, have invented certain new and useful Improvements in Spring Suspensions for Vehicles, of which the following is a specification.

This invention relates to the suspension of vehicles, more particularly automobiles, by means of plate or leaf springs, such springs being of the kind in which each spring unit comprises a plurality of spring elements which on light loads are normally separated from one another for most of their lengths, but which progressively contact with one another as the load increases, thus automatically stiffening the spring suspension in proportion to the load.

The object of the present invention is to provide a spring unit of the kind above described in which the separated elements comprising a complete spring unit consist of a minimum number of plates or leaves while maintaining a maximum resiliency, and which at the same time will offer greater resistence to tortional stresses than is possible with springs having the usual form of spring plates.

This object is attained according to the present invention by forming the plates or leaves of the spring units of tapering width, the said plates or leaves being in contact at their widest portions and diverging toward their outer ends, while the contacting portions are adapted to be anchored to the chassis of the vehicle and the outer end or ends of the lower spring element is or are adapted for connection to the axle of the vehicle, or vice versa according to the arrangement desired.

With such a form of spring unit, for ordinary automobile work a spring unit may comprise two single superimposed plates.

The spring units may be of quarter or semi-elliptic formation, combinations of these two formations giving three-quarter and double-elliptic formations.

According to a preferred form of construction particularly adapted for transverse springing, a semi-elliptic formation comprises two quarter-elliptic spring units connected by a yoke or the like.

A three-quarter-elliptic form comprises a quarter-elliptic unit connected at the outer end of its element of greater curvature to one of the ends of the corresponding element of a semi-elliptic unit. For a double-elliptic form two semi-elliptic units are inverted relatively to one another and are connected at the outer ends of their elements of greater curvature. In both cases the connections to the chassis and axle may be according to any desired practice, while the connection between the units may be by means of links or the like.

The springs are connected at their outer ends by shackles or stirrup bolts comprising an adjustment whereby the distance between the two springs and consequently the degree of contact between them may be varied to suit the load.

Embodiments of the improved suspension according to the present invention are illustrated in the accompanying drawings, in which:—

Figs. 1 and 2 show in side elevation and plan respectively a quarter-elliptic form of suspension.

Figs. 3 and 4 are similar views of a half-elliptic form of suspension.

Figs. 5 and 6 are similar views of a modified form of half-elliptic suspension, and Fig. 7 is a fragmentary view in elevation, partly in section showing an alternative method of connecting two quarter-elliptic springs.

Fig. 8 is a plan view of Fig. 7 viewed from beneath.

Fig. 9 is an end view of a shackle.

Fig. 10 is a fragmentary view in elevation showing an alternative method for adjusting the springs.

Referring more particularly to the suspension shown in Figs. 1 and 2, the spring or spring unit is composed of a single top spring leaf *a* which is substantially straight, and of a lower leaf *b* which is curved and of quarter-elliptic formation. These spring plates *a* and *b* are connected at *c*, where they are adapted to be anchored to the chassis of the vehicle in any convenient manner, and they diverge toward their outer ends as shown. The outer end of the lower spring is adapted for connection to the axle of the vehicle at *d*, such connection being either a fixed or sliding one as desired. The springs are connected at their outer ends by a shackle *e* carrying at its lower end a supporting member or stop $f$ for the outer end of the lower spring.

It will be seen that in operation the lower spring on being flexed will contact progressively along its upper surface with the spring above, from the fixed ends $c$ of the spring outwards, in proportion to the magnitude of the load or shock imparted to the springs.

Referring to Figs. 3 and 4 showing a half-elliptic form of springing particularly adapted for transverse springing, the two superimposed springs $a$, $b$ are maintained in contact intermediate of their ends at $c$ where they are adapted for connection to the chassis, while the outer ends of the lower spring are connected at $h$ to the axle.

In the modified arrangement for transverse springing as shown in Figs. 5 and 6, two sets of springs of quarter-elliptic form, similar to that shown in Figs. 1 and 2, are connected at their inner ends to a yoke or the like $i$ connected as by clamp bolts $j$ to the chassis $k$ of the vehicle.

Figs. 7 and 8 show an alternative form of connection of the springs to the yoke member. In this arrangement the springs are secured to the underside of the yoke, their ends being adapted to fit snugly in a recess formed by the lip $t$. With this construction the stress of the ends of the spring when under load is taken by the lip $t$ instead of by the fastening bolts which now act merely to prevent horizontal movement of the spring.

In the form shown in the said figures the end of the spring is rounded and the lip $t$ is segmental in plan view. This is to allow of movement of the spring about the centre of the bolt hole $u$ during assemblage for registering the bolt holes $v$ without interfering with the snugness of the fit of the spring in the recess. However, any other form of recess may be used.

In the several forms set forth adjustment is provided whereby the distance between the two springs, and thus the degree of contact between them, may be varied to suit the load, this being conveniently effected as by providing supporting members $f$ which are adjustable to suit the load and road conditions. The members $f$ are shown in detail in Fig. 9 and consist preferably of a roller carried by an eccentrically disposed bolt $l$ bridging the cheeks of the shackle $e$ so that it may be turned to give the desired adjustment, the members $f$ being locked in the adjusted position by screwing up the nut of the bolt $l$. The members $f$ are preferably of rubber or other resilient material so that they will offer a resilient resistance to the rebound of the springs.

Similar buffer members $f^1$ may also be provided in all cases underneath the top spring, as shown in Fig. 5, which will act as resilient stops with a maximum upward deflection of the lower spring $b$ and which will also transmit movement of the lower spring to the upper one, the two springs then acting jointly as one.

In addition to, or alternatively to the adjustment provided by the stops $f$, similar adjustment may be provided by the shackles $e$ which are slidable along the springs in either direction, the shackles being secured in the adjusted position by a bolt $m$ which engages through a slot $m^1$ in the top spring plate.

It will be seen that by moving the shackle in either direction along the springs, the two springs will be brought together through the roller $f$, or allowed to move apart according to the direction of adjustment.

Fig. 10 shows an alternative method of effecting the adjustment of the springs. The letter $n$ indicates a strap bolt having its strap end secured to the lower spring $b$ and prevented from longitudinal movement thereon by a distance piece $o$, while its shank passes through a slot in the upper spring. The said distance piece $o$ has an eye $o^1$ formed at one end through which is passed the bolt for retaining the strap portion of the strap bolt $n$ on the spring plate $b$, while its other end abuts against the end of the spring plate $b$. A resilient buffer $p$ threaded over the shank of the bolt abuts against the strap portion of the bolt, while a second resilient buffer $p^1$, also threaded over the bolt shank, abuts at its lower face against the upper surface of the spring $a$, and at its upper face against a washer $q$. Adjustment of the springs is effected by means of the nut $r$ which is adapted to be locked by the lock nut $s$. The strap bolt $n$ as shown comprises a single member, but if desired the shank of the bolt may be pivoted to the strap portion.

I claim:—

1. A spring suspension for vehicles comprising a pair of spring units, each of said units comprising a plurality of spring plates of tapering width which are in contact at their widest portions and diverge towards their outer ends, said contacting portions comprising one end of the unit, a yoke, a lip on the underside of said yoke adapted to receive the contacting ends of said pair of units, means for rigidly securing said contacting ends to said underside of the yoke, and means for connecting said yoke to one of the members of the vehicle between which the spring suspension is to be inserted, the outer ends of the plates of greater curvature being adapted to be connected to the other of said members.

2. A spring suspension for vehicles comprising a pair of spring units, each of said units comprising a pair of spring plates of tapering width which are in contact at their widest portions and diverge towards their outer ends, said contacting portions comprising one end of the unit, a yoke, a lip on the underside of said yoke adapted to receive the contacting ends of said pair of units, means for rigidly securing said contacting ends to said underside of the yoke, and means for connecting said yoke to one of the members of the vehicle between which the spring suspension is to be inserted, the outer ends of the plates of greater curvature being adapted to be connected to the other of said members.

3. A spring unit for vehicles comprising a plurality of spring plates of tapering width which are in contact at their widest portions and diverge towards their outer ends, and an adjustable stop on each of said shackles adapted to abut against the outer surface of one of the spring plates, the contacting portions of the plates being adapted for connection to one of the members of the vehicle between which the spring unit is to be inserted, while the outer portion of the plate of greater curvature is adapted for connection to the other of said members.

4. A spring unit for vehicles comprising a pair of spring plates of tapering width which are in contact at their widest portions and diverge towards their outer ends, shackles for connecting said outer ends, and an adjustable stop on each of said shackles adapted to abut against the outer surface of one of the spring plates, the contacting portions of the plates being adapted for connection to one of the members of the vehicle between which the spring unit is to be inserted, while the outer portion of the plate of greater curvature is adapted for connection to the other of said members.

5. A spring suspension for vehicles comprising a pair of spring units, each of said units comprising a plurality of spring plates of tapering width which are in contact at their widest portions and diverge towards their outer ends, said contacting portions comprising one end of the unit, shackles for connecting said outer ends, an adjustable stop on each of said shackles adapted to abut against the outer surface of one of the spring plates, a yoke for connecting said contacting ends, and means for connecting said yoke to one of the members of the vehicle between which the spring suspension is to be inserted, the outer ends of the plates of greater curvature being adapted to be connected to the other of said members.

6. A spring suspension for vehicles comprising a pair of spring units, each of said units comprising a pair of spring plates of tapering width which are in contact at their widest portions and diverge towards their outer ends, said contacting portions comprising one end of the unit, shackles for connecting said outer ends, an adjustable stop on each of said shackles adapted to abut against the outer surface of one of the spring plates, a yoke for connecting said contacting ends, and means for connecting said yoke to one of the members of the vehicle between which the spring suspension is to be inserted, the outer ends of the plates of greater curvature being adapted to be connected to the other of said members.

7. A spring unit for vehicles comprising a pair of spring plates of tapering width which are in contact at their widest portions and diverge towards their outer ends, shackles for connecting said outer ends, an adjustable stop on each of said shackles adapted to abut against the outer surface of one of the spring plates, and a second stop on each of said shackles disposed between the two spring plates at their outer ends, the contacting portions of the plates being adapted for connection to one of the members of the vehicle between which the spring unit is to be inserted, while the outer portions of the plate of greater curvature are adapted for connection to the other of said members.

8. A spring suspension for vehicles comprising a pair of spring suits, each of said prising a pair of spring plates of units comprising a pair of spring plates of tapering width which are in contact at their widest portions and diverge towards their outer ends, said contacting portions comprising one end of the unit, shackles for connecting said outer ends, an adjustable stop on each of said shackles adapted to abut against the outer surface of one of the spring plates, a second stop on each of said shackles disposed between the two spring elements at their outer ends, a yoke for connecting said contacting ends, and means for connecting said yoke to one of the members of the vehicle between which the spring suspension is to be inserted, the outer ends of the plates of greater curvature being adapted to be connected to the other of said members.

9. A spring unit for vehicles comprising a pair of spring plates of tapering width which are in contact at their widest portions and diverge towards their outer ends, shackles for connecting said outer ends, means for adjusting said shackles along said spring plates, and an adjustable stop on each of said shackles adapted to abut against the outer surface of one of the spring plates, the contacting portions of the plates being adapted to be connected to one of the members of the vehicle between which the spring unit is to be inserted, while the outer portions of the plate of greater curvature are adapted for connection to the other of said members.

10. A spring suspension for vehicles comprising a pair of spring units, each of said units comprising a pair of spring plates of tapering width which are in contact at their widest portions and diverge towards their outer ends, said contacting portions comprising one end of the unit, shackles for connecting said outer ends, means for adjusting said shackles along said spring plates, an adjustable stop on each of said shackles adapted to abut against the outer surface of one of the spring plates, a yoke for connecting said contacting ends, and means for connecting said yoke to one of the members of the vehicle between which the spring suspension is to be inserted, the outer ends of the plates of greater curvature being adapted to be connected to the other of said members.

11. A spring unit for vehicles comprising a pair of spring plates of tapering width which are in contact at their widest portions and diverge towards their outer ends, shackles for connecting said outer ends, means for adjusting said shackles along said spring plates, an adjustable stop on each of said shackles adapted to abut against the outer surface of one of the spring plates, and a second stop on each of said shackles disposed between the two spring plates at their outer ends, the contacting portions of the plates being adapted to be connected to one of the members of the vehicle between which the spring unit is to be inserted, while the outer portions of the plate of greater curvature is adapted for connection to the other of said members.

12. A spring suspension for vehicles comprising a pair of spring units, each of said units comprising a pair of spring plates of tapering width which are in contact at their widest portions and diverge towards their outer ends, said contacting portions comprising one end of the unit, shackles connecting said outer ends, means for adjusting said shackles along said spring plates, an adjustable stop on each of said shackles adapted to abut against the outer surface of one of the spring plates, a second stop on each of said shackles disposed between the two spring plates at their outer ends, a yoke for connecting said contacting ends, and means for connecting said yoke to one of the members of the vehicle between which the spring suspension is to be inserted, the outer ends of the plates of greater curvature being adapted to be connected to the other of said members.

13. A spring unit for vehicles comprising a pair of spring plates of tapering width which are in contact at their widest portions and diverge towards their outer ends, strap bolts for connecting said outer ends, and means on said strap bolts for varying the distance between said spring plates, the contacting portions of the plates being adapted to be connected to one of the members of the vehicle between which the spring unit is to be inserted, while the outer portions of the plate of greater curvature are adapted for connection to the other of said members.

14. A spring suspension for vehicles comprising a pair of spring units, each of said units comprising a pair of spring plates of tapering width which are in contact at their widest portions and diverge towards their outer ends, said contacting portions comprising one end of the unit, strap bolts for connecting said outer ends, means on said strap bolts for varying the distance between said spring plates, a yoke for connecting said contacting ends, and means for connecting said yoke to one of the members of the vehicle between which the spring suspension is to be inserted, the outer ends of the plates of greater curvature being adapted for connection to the other of said members.

In witness whereof I have signed this specification.

CHARLES HENRY LUTMAN.

Witnesses:
QUOD ATTERTOR,
JOHN PHILIP HALL.